US007007080B2

(12) United States Patent
Wilson

(10) Patent No.: US 7,007,080 B2
(45) Date of Patent: Feb. 28, 2006

(54) SYSTEM FOR RECONFIGURING AND REGISTERING A NEW IP ADDRESS FOR A COMPUTER TO ACCESS A DIFFERENT NETWORK WITHOUT USER INTERVENTION

(75) Inventor: Tim Wilson, Halifax (CA)

(73) Assignee: Solution Inc Limited, Halifax (CA)

( * ) Notice: Subject to any disclaimer, the term of this patent is extended or adjusted under 35 U.S.C. 154(b) by 803 days.

(21) Appl. No.: 09/742,006

(22) Filed: Dec. 22, 2000

(65) Prior Publication Data

US 2001/0054101 A1 Dec. 20, 2001

Related U.S. Application Data

(60) Provisional application No. 60/171,644, filed on Dec. 27, 1999.

(30) Foreign Application Priority Data

Dec. 23, 1999 (CA) ............................................ 2293765

(51) Int. Cl.
*G06F 15/177* (2006.01)

(52) U.S. Cl. ....................... 709/221; 709/220; 709/223; 709/245

(58) Field of Classification Search ................. 709/221, 709/220, 222, 245, 227, 228, 219, 223; 370/354, 370/338, 401; 379/88.17; 707/10
See application file for complete search history.

(56) References Cited

U.S. PATENT DOCUMENTS

| | | | | | |
|---|---|---|---|---|---|
| 5,142,622 | A | | 8/1992 | Owens | |
| 5,309,437 | A | | 5/1994 | Perlman et al. | |
| 5,426,637 | A | | 6/1995 | Derby et al. | |
| 5,598,536 | A | * | 1/1997 | Slaughter et al. | 709/219 |
| 5,727,159 | A | | 3/1998 | Kikinis | |
| 5,754,547 | A | | 5/1998 | Nakazawa | |
| 5,761,439 | A | | 6/1998 | Kar et al. | |
| 5,768,525 | A | | 6/1998 | Kralowetz et al. | |
| 5,777,989 | A | | 7/1998 | McGarvey | |
| 5,784,555 | A | | 7/1998 | Stone | |
| 5,790,548 | A | * | 8/1998 | Sistanizadeh et al. | 370/401 |
| 5,812,819 | A | | 9/1998 | Rodwin et al. | |
| 5,815,516 | A | | 9/1998 | Aaker et al. | |
| 5,835,725 | A | * | 11/1998 | Chiang et al. | 709/228 |
| 5,918,016 | A | * | 6/1999 | Brewer et al. | 709/220 |
| 6,101,499 | A | * | 8/2000 | Ford et al. | 707/10 |
| 6,233,318 | B1 | * | 5/2001 | Picard et al. | 379/88.17 |
| 6,466,981 | B1 | * | 10/2002 | Levy | 709/227 |
| 6,510,153 | B1 | * | 1/2003 | Inoue et al. | 370/354 |
| 6,591,306 | B1 | * | 7/2003 | Redlich | 709/245 |
| 6,614,774 | B1 | * | 9/2003 | Wang | 370/338 |
| 6,636,894 | B1 | | 10/2003 | Short et al. | |

FOREIGN PATENT DOCUMENTS

| | | |
|---|---|---|
| EP | 0 899 925 A2 | 3/1999 |
| WO | WO 99/38303 | 7/1999 |

* cited by examiner

*Primary Examiner*—Le Hien Luu

(57) ABSTRACT

A server and method is provided that allows a computer configured for a different network to access a network without hardware or software configuration changes to the computer. The invention allows users to plug into the network and access not only the network that their computer is connected to but also to the Internet, the Worldwide Web and the individual's email. This is particularly useful to visitors to multiple unit buildings such as hotels. Not only can the service be provided by the server and method of the invention connected to and carried out on the network but it does not require manual configuration changes to the computer or new software or hardware for the computer. In situations where access is to be controlled this is done through a registration driver and module. Only registered guests have access to the network and the services and access it provides. The invention determines and assigns addressing information to properly direct traffic to and from the computer. The invention provides for the storage and maintenance of the addressing data. Registration status information and billing information is collected and maintained to determine access to and billing for services.

10 Claims, 8 Drawing Sheets

Billing Components and Interaction

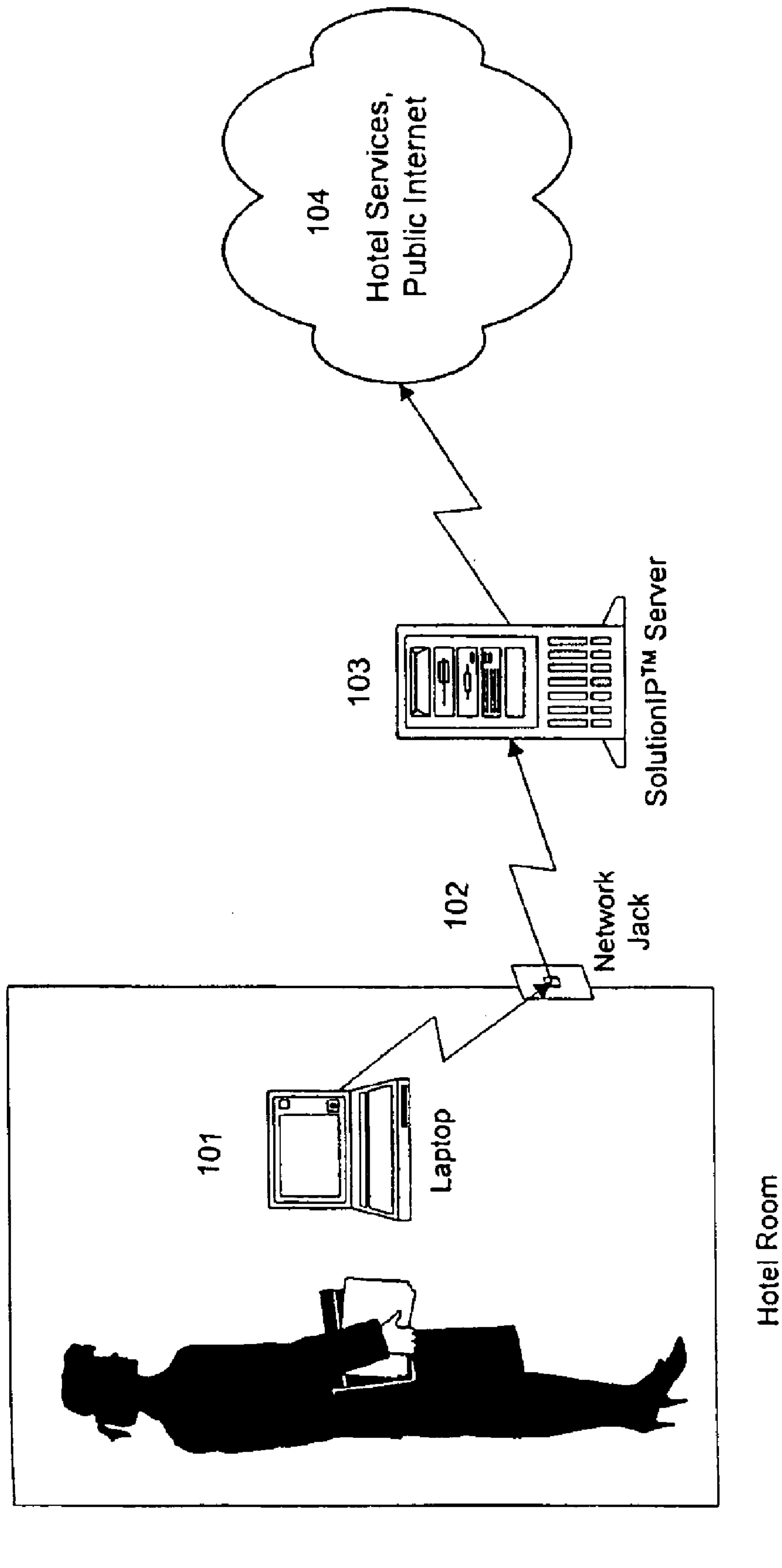
Fig.1 Typical Server Connection in Hotel Environment

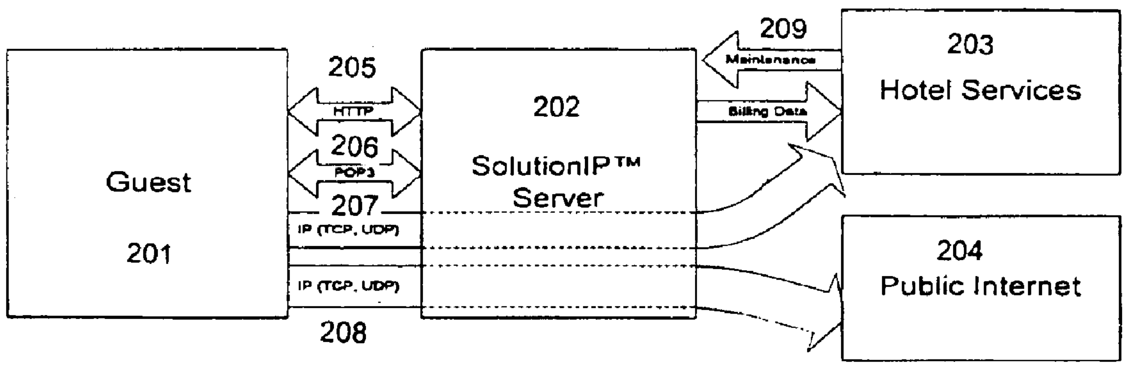
Fig. 2 Functional Block Diagram

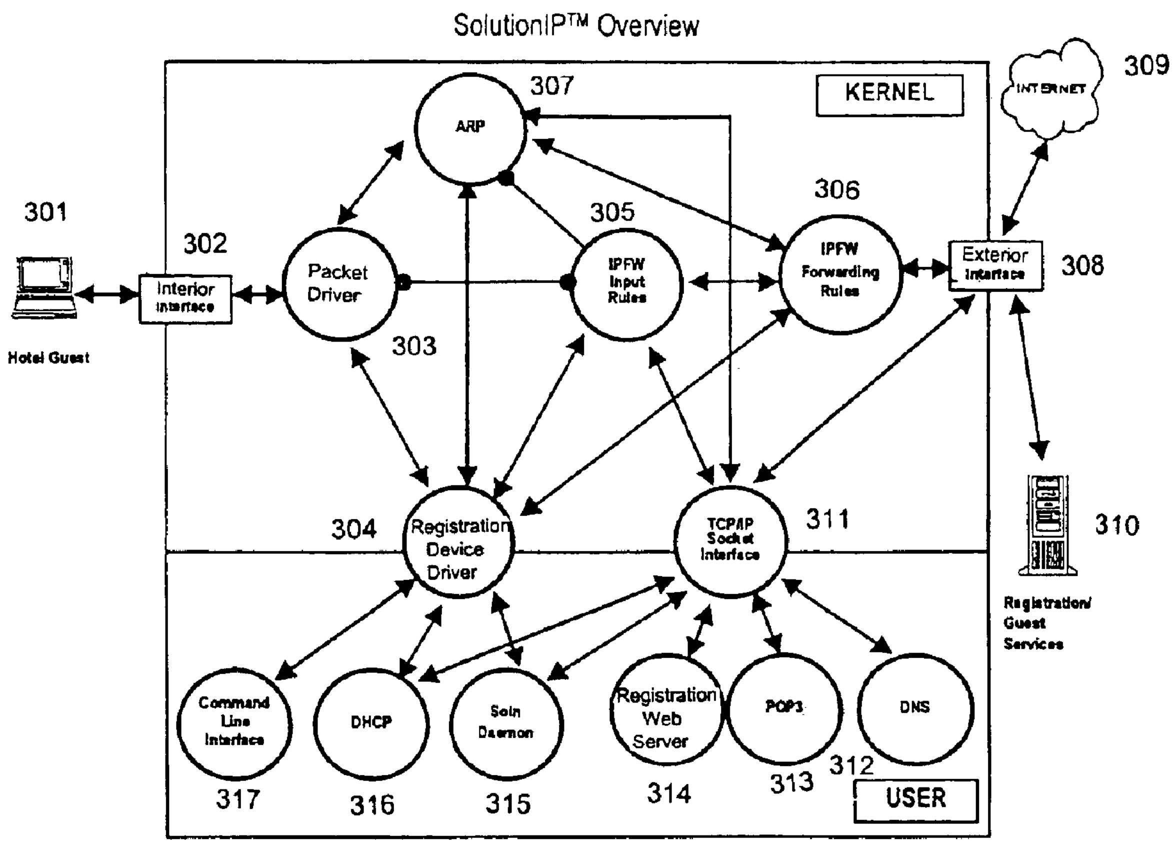
Fig. 3 Server Components and Interactions

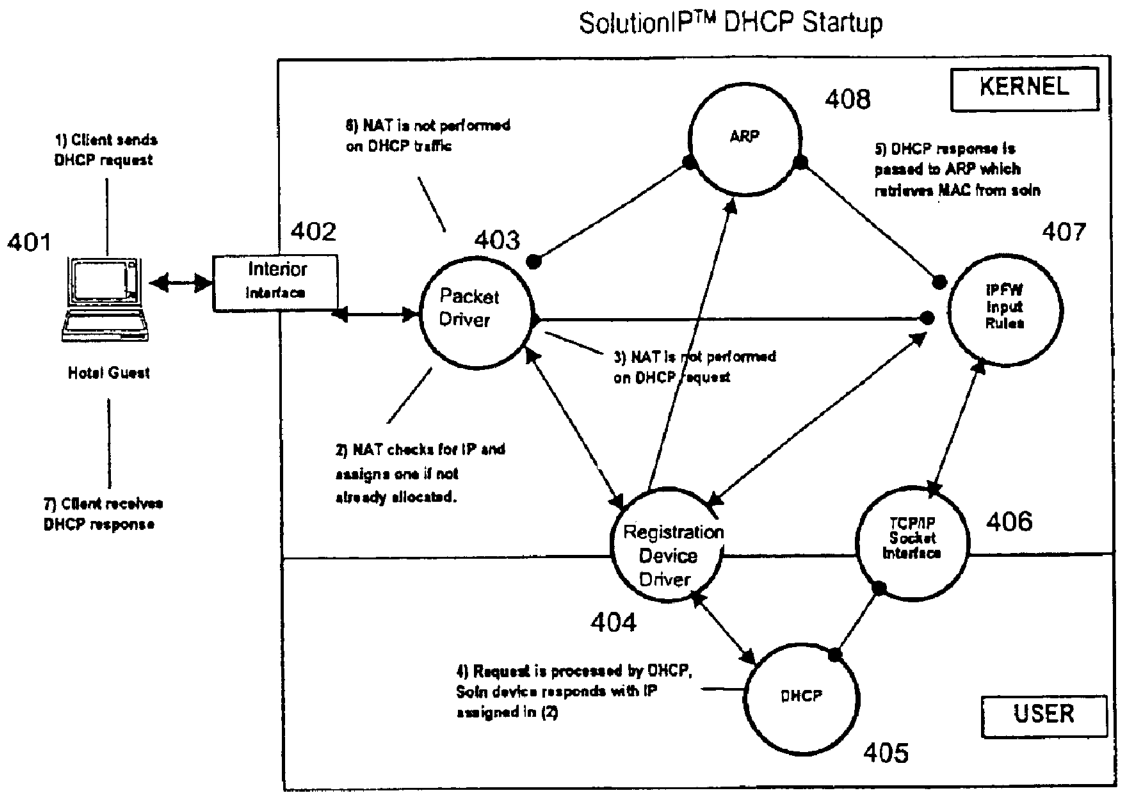
Fig. 4 DHCP Request Processing

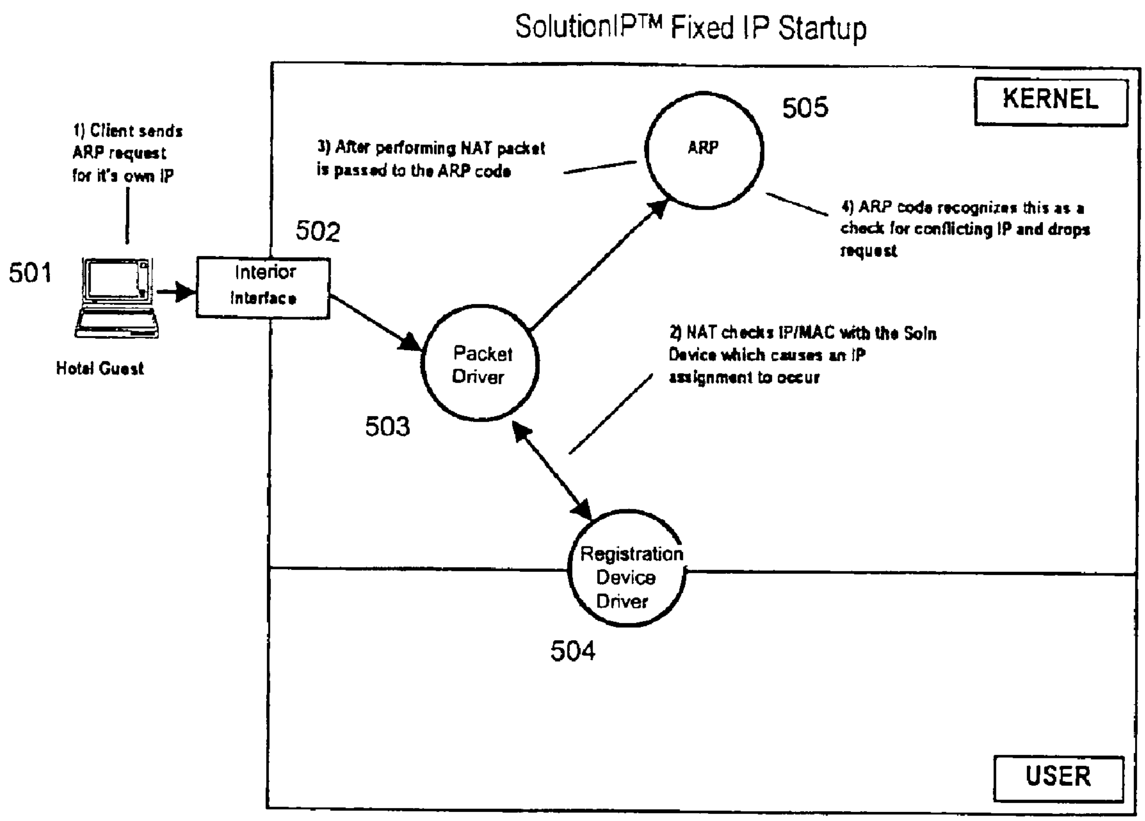
Fig. 5 ARP Request Processing

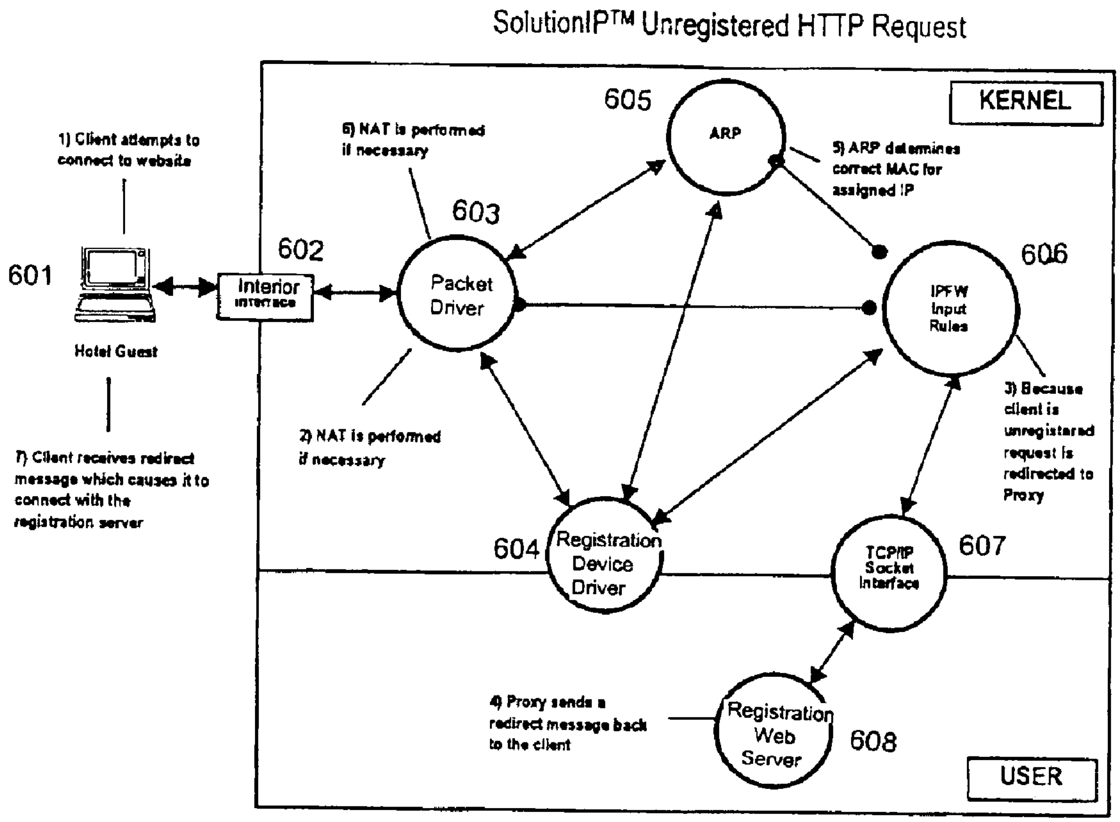
Fig.6 Unregistered HTTP Request Processing

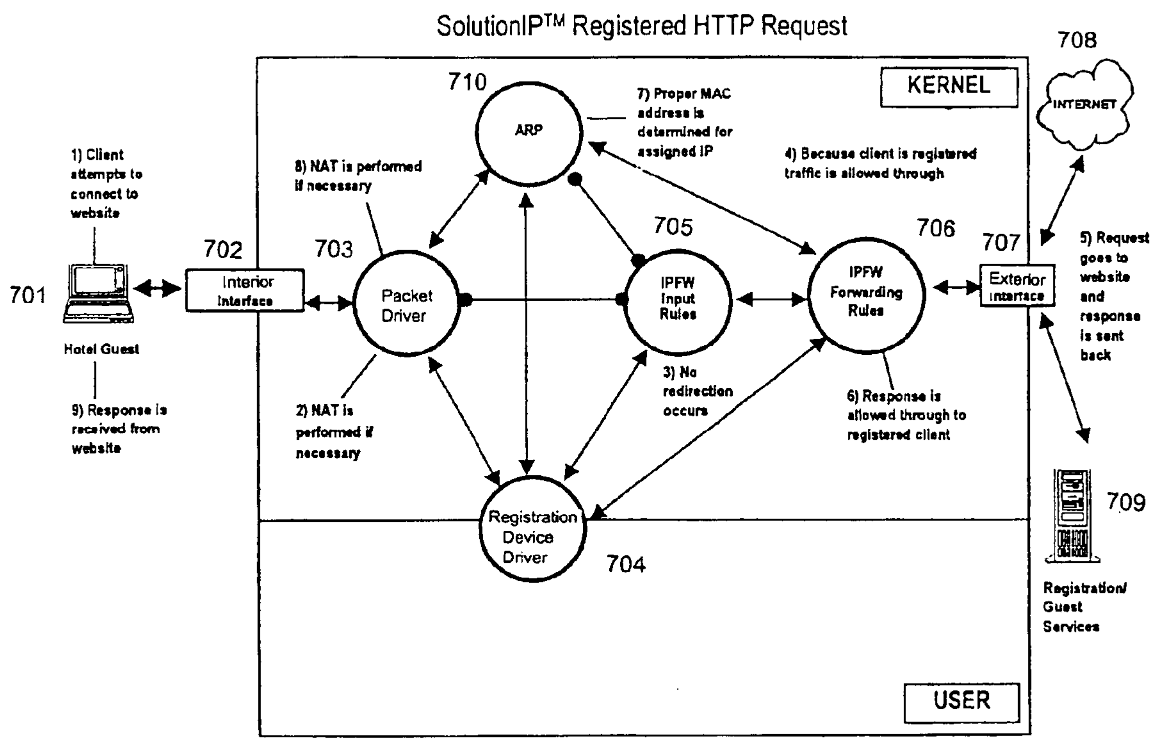
Fig. 7 Registered HTTP Request Processing

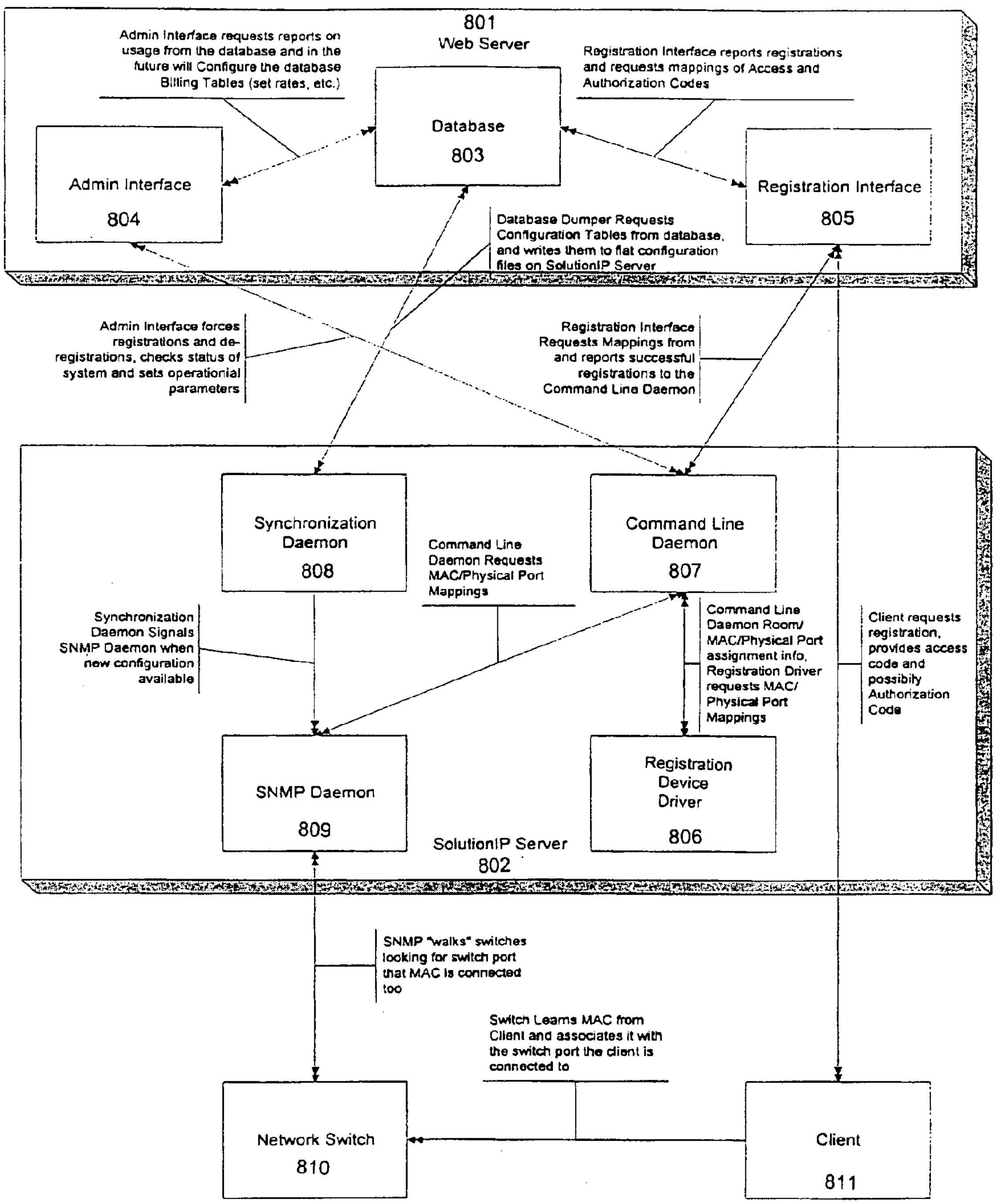
Fig. 8 Billing Components and Interaction

SYSTEM FOR RECONFIGURING AND REGISTERING A NEW IP ADDRESS FOR A COMPUTER TO ACCESS A DIFFERENT NETWORK WITHOUT USER INTERVENTION

This application claims the benefit of provisional application No. 60/171,644, filed Dec. 27, 1999.

FIELD OF THE INVENTION

This invention relates generally to LANs, WANs and access to these and other networks by mobile users whose computers are not necessarily configured for the network to which they are being connected.

BACKGROUND OF THE INVENTION

In describing the invention different terms are sometimes used for the mobile user equipment being connected to a different network than the user's computer has been configured for. The equipment is typically a laptop computer but can be any similar processing unit or system. It may be referred to throughout this specification as a computer, laptop computer, notebook, notebook computer, personal digital assistant, system, client computer, client, and mobile. Currently, a user is not able to take a computer that has been configured to work on their personal ISP or employer's office LAN/WAN and plug it into another network and expect it to work. In a traditional TCP/IP (Transport Control Protocol/Internet Protocol) environment, a user would typically have to manually re-configure a device such as a notebook computer to gain access to other TCP/IP networks. Current TCP/IP communications protocols in all operating systems, i.e. Unix, Linux, Windows, Mac, etc., have been designed to operate in a preset environment and not to be mobile. Mobile users can currently dial into an ISP with a modem to access the Internet. However, dial-up networking is slower than Ethernet and like networks and can be expensive if the user must dial long distance to access their ISP. Furthermore, dial-up networking can tie up telephone lines and PBX resources which may be undesirable in an environment such as a hotel. Presently there is no simple and effective way to authorize and control access to a network by mobile users other than manually. There is also no ability currently to collect and maintain information for billing for the services used by the mobile user.

SUMMARY OF THE INVENTION

It is an object of the present invention to overcome one or more of the problems cited above. he present invention is directed to a method and apparatus for allowing remote users to access TCP/IP services regardless of the TCP/IP configurations of their remote computer. Users can simply plug their Network Interface Card (NIC ) into a network data jack and instantly gain access to high-speed TCP/IP based services without any requirement to have an account with any ISP whatsoever.

According to an embodiment of the invention, a server provides remote access to the World Wide Web without change to the remote mobile user's computer. No additional software or hardware is added to, and no configuration or hardware changes are required by, the remote computer. Advantages of the present invention include: ease of use; no change required to the remote computer; and for a hotel or service industry member wishing to provide plug and go Internet access to its clients, revenue can be gained or a service to its clients can be offered while reducing demands upon its internal telephone system (PBX).

One aspect of the invention is a method of providing a user access to a network for a computer configured for a different network without user initiated software or hardware configuration changes comprising the steps of automatically determining and assigning addressing information for the computer on the foreign network; registering the computer; permitting only registered computers to access the foreign network; storing and maintaining the addressing information; and accessing the foreign network by directing traffic to and from the computer utilizing the addressing information.

Another aspect of the invention is a computer readable medium containing the computer instructions that when executed on a computer will carry out the above method.

Another aspect of the invention is a server for use with a network to provide access to a computer configured for a different network without reconfiguring the computer through hardware or software comprising: a registration module to register the computer to access the network; a registration driver to maintain and access addressing information; a packet driver module to perform NAT at the internal interface; a packet filter that permits transmission of packets to and from the external interface based on registration status; a DHCP module to service DHCP request based on assigned IP address; an ARP module that uses the registration driver to provide MAC address for an assigned IP address ;an internal interface to connect the server to the computer; and, an external interface to connect the server to the network.

Another aspect of the invention provides billing functionality. The server blocks any attempt by a user to access the Internet or e-mail without first registering for the service. The server also keeps track of the time each user spends online for each session and sends this information to the hotel or conference centre network for billing purposes.

BRIEF DESCRIPTION OF THE DRAWINGS

FIG. 1 is a pictorial representation of a typical server connection in a hotel environment.

FIG. 2 shows a functional block diagram of an embodiment of the present invention.

FIG. 3 shows an example of the core components and interactions of the server according to the present invention.

FIG. 4 shows an example of DHCP request processing.

FIG. 5 shows an example of ARP request processing.

FIG. 6 shows an example of unregistered HTTP request processing.

FIG. 7 shows an example of registered HTTP request processing.

FIG. 8 shows billing components and interactions.

DESCRIPTION OF THE PREFERRED EMBODIMENTS

The detailed description of the invention is set out below, including description of the best mode of implementing the inventions. The description is carried out with reference to the drawings.

An embodiment of the present invention involves its use in the hotel industry. The primary objective is to provide guests with the ability to log into the Internet from their hotel rooms without having to modify their personal mobile computer network settings. The guests will be able to transparently and seamlessly get their email, surf the web, and carry out their normal Internet activities.

Introduction

The commercial embodiment of the server and method of the invention is identified by the trade-mark SolutionIP™. The invention is referred to from time to time by its trade-mark and means the server and/or other aspects of the invention as the context may dictate. This invention is useful in multi-unit buildings whether used as offices, apartments and/or for hotels or similar accommodation buildings. The plug and go connectivity allows tenants (or guests) in a building to re-locate and re-connect to the Internet from any location within the building in such a way that the Internet access appears transparent and seamless. It is also advantageous to use the invention in seminar rooms, boardrooms, training rooms and like areas where users wish to access the LAN for the room with their own computer.

A preferred implementation of SolutionIP™ is for the hotel industry. The primary objective is to provide guests with the ability to log into the Internet from their hotel rooms without having to modify their personal computer network settings. The guests will be able to transparently and seamlessly get their email, surf the web, etc. as if they were in their offices.

Usage Scenario

A typical usage scenario for the SolutionIP™ invention is shown in FIG. 1 and consists of a business traveler requiring access to her companies email server from their hotel room. After connecting her laptop 101 to the hotel room's network jack 102 and registering for the SolutionIP™ service, the hotel guest can access the Internet, as well as online hotel services 104 (eg. Virtual Concierge) using the high-speed Internet connection of the hotel. She can then connect to the company email server via the Internet at speeds much higher than possible using a dial-up network connection. The server invention 103 provides the seamless and transparent connectivity.

SolutionIP™ is a server-based solution designed to allow users to connect a computer with a working Ethernet Network Interface Card (NIC) and an IP-based network configuration to the Internet. The guests physically connect to the SolutionIP™ system via a network interface connection. Most users will have seamless connectivity, however there are limitations, which are described in detail below.

Users are required to register with the system using a browser application before Internet connectivity is established. The server will detect all attempts at gaining access to the Internet and continue to redirect users to a SolutionIP™ web site until registration is completed. Once registered, they will be able to use the high-speed Internet connection of the hotel to access corporate computing resources and email via the Internet, browse the World Wide Web (WWW), etc.

Guests attempting to pop (read or download) their email before registration are issued an email message. The message simply asks them to register using their browser before email can be downloaded.

Functional Overview

SolutionIP™ translates network traffic from client (hotel guest) computers in such a way that it can be properly routed to and from the client via the hotel Internet connection. This is possible regardless of the current network settings (IP address, DNS servers, gateway, etc.) on the client machine, provided that the existing configuration is functional. (i.e. The client machine must have a working network configuration, although the actual addresses used are not expected to be configured for the hotel's network). SolutionIP™ transparently translates the settings of the client machine into addresses appropriate to the hotel's network environment while routing data to the Internet. In addition, the server "reverse translates" return network traffic to use addresses compatible with the client computer's configuration.

More specifically, only IP-based protocols are currently supported. Other types of network traffic are ignored and not forwarded by SolutionIp™. SolutionIP™ provides DHCP (Dynamic Host Configuration Protocol) server functionality, which is used to supply configuration data to those clients configured to dynamically obtain their network settings. DNS (Domain Name Service) requests are intercepted by SolutionIP™ (based on destination port number) and serviced locally by a DNS server running in the hotel. Outbound network traffic is intercepted by the SolutionIP™ server, which acts as a gateway to the Internet and forwards the data as appropriate. SolutionIP™ will pretend it is the client's gateway, even if the client has specified a different gateway, such as the one normally used by the client in the office.

Unauthorized use of the network (i.e. network traffic from clients who have not registered for the network service) is blocked by SolutionIP™ until the client registers. SolutionIP™ maintains a list of those client computers that have been registered and are authorized to use the network. Traffic from authorized clients is routed, while other traffic is discarded or redirected.

FIG. 2 provides a functional block diagram of the invention in a typical hotel application.

The guest 201 connects to the hotel network and the SolutionIP™ server 202 carries out the appropriate functions to handle browser traffic 205 (HTTP), email 206 (POP3), hotel services traffic (207) (IP(TCP, UDP)) and Internet traffic 208 (IP(TCP,UDP)). The server 202 also provides a facility to handle maintenance traffic 209 from hotel services. Billing data 210 is collected and maintained in the server and supplied to hotel services as required.

A guest can communicate with the SolutionIP™ server via Hypertext Transfer Protocol (HTTP) requests 205 (the protocol used to access the WWW), or email requests 206 (POP3). Once registered, IP-based traffic originating from the guest's computer passes through the SolutionIP™ server to the Hotel Services Intranet 203 or to the Public Internet 204.

In general, the SolutionIP™ solution is not directly involved with attempts to secure the hotel network from external threats. Creating and enforcing a security policy for the Internet connection of the hotel is to be dealt with by other components of the overall solution. SolutionIP™ does not perform filtering of in-bound network traffic destined for registered clients.

The SolutionIP™ server has unnecessary services disabled and file permissions checked to try to prevent malicious modifications. The only login access to a SolutionIP™ server is by secure shell (SSH), serial connection or from the console.

Registration and Usage Component

The registration component is a web-based application, which allows hotel guests to register for the network service, as well as log off from it. It is accessible to all guests who are connected to the network (i.e. access to the registration site is not blocked by SolutionIP™). The web server for the registration component can run on a separate machine from SolutionIP™ minimizing the load on SolutionIP™.

Prior to registration for the network service, any attempts to access WWW and POP3 (a type of email) servers are detected by SolutionIP™ and intercepted. This is based on the TCP port number. These requests are answered by SolutionIP™ or forwarded to the web server where information is provided on how to register for the hotel network service. Although this embodiment is specifically POP3 other email protocols could be included.

SolutionIP™ also has the ability to track registration information, which can be used for billing purposes. Currently this information is available through an administration web site that displays who is connected to the network, who is registered, time and date of registration, etc. The server could implement a feature to track data volumes.

Client Requirements

Although the system is a server-only solution and transparent to registered clients, there are certain minimum requirements for client computers. SolutionIP™ is designed to operate without modifications to the client's computer configuration in the majority of cases, but certain components must be present and working. A utility could enable certain systems to access the network if the client does not meet the minimum requirements.

Minimum client requirements are:

Ethernet Network Interface Card installed and configured, with compatible interface to hotel network jacks;

Installed TCP/IP stack, configured for DHCP or for static IP address, gateway, and DNS server(s); and Web browser configured for direct network access (i.e. not a dialup-only browser configuration and without proxies enabled). (Only required for registration/logoff process and The requirements described in this document are sufficient to allow the majority of clients to connect easily to the Internet via hotel networking facilities. However, some clients will have system configurations that will not allow connectivity through the SolutionIP™ server.

High Level Design

SolutionIP™ provides transparent network access via two mechanisms:

Network Address Translation (NAT): Each internal system is given a unique IP address to communicate with the Internet. This allows external connections to clients and facilitates UDP based protocols as well, but will require that a sufficient set of routable IP numbers be available for assignment at each installation.

Masquerading: Each internal system appears to the outside world with the IP address of the server. This requires special protocol-aware handlers (proxies) for protocols like active-mode FTP which try to create independent return connections back to the client, and also modifications are made to support UDP "connections" (statefull packet inspection).

SolutionIP™ utilizes NAT as the primary mechanism for providing transparent network access. Despite the problems associated with IP number allocation this choice offers the best available mechanism to effectively deal with various unsupported network protocols. The preferred embodiment of the invention is based on a customized version of the Linux operating system.

There are two main scenarios:

The client is configured to use a particular, fixed IP configuration. The server captures Address Resolution Protocol (ARP) requests from the client and the server responds with its own Media Access Control (MAC) address. The client is assigned an IP address, which is mapped to the client's configured IP address and its MAC address. If the client has not "registered" for the service, then any attempts to communicate with a web server or a pop server will result in a redirection to the registration screen (web) or a mail message with directions to the registration screen. Once they have registered, the client logs off the registration system, their traffic is allowed to proceed unimpeded. As the traffic passes through the server, the IP address of the client is translated back and forth between the configured (fixed) IP address and the server-assigned IP address.

The client uses DHCP. In this case SolutionIP™'s DHCP server component assigns an IP address and then SolutionIP™ acts simply as a router, except that normal IP traffic is blocked or redirected until the client goes through the registration process.

Core Server Components and Interactions

FIG. 3 shows the breakdown of the core components of the invention and their interactions. These components are further described below.

ARP

The ARP module 307 of the server uses ARP which is a standard networking protocol the behavior of which is described below.

ARP (Address Resolution Protocol) (See RFC-826 (RFC stands for Request For Comment and is the standard way of asking for comments on standards and other aspects of internet operation via the internet. A website that is useful in accessing the various RFCs is www.faqs.com)for the protocol specification) is intended to provide a method for one machine to obtain the MAC (Media Access Control) Address of a system for which they know the IP address. Typically, a machine will determine that the machine that they wish to communicate with is on the same local network by comparing the IP address of the target machine with their own IP address information. If the machine they want to communicate with is on the same network, currently there is no association between the IP address of the target system and a MAC address then the machine will make an ARP request for the target machine's IP address. If the target machine is active, it should be watching for ARP requests and if the IP address specified in the ARP request matches the IP address of the target machine it will respond to the ARP request.

The address resolution protocol is a protocol used by the Internet Protocol (IP) network layer protocol to map IP network addresses to the hardware addresses used by a data link protocol. This protocol is used below the network layer as a part of the OSI link layer, and is used when IP is used over Ethernet.

The term address resolution refers to the process of finding an address of a computer in a network. The address is "resolved" using a protocol in which a piece of information is sent by a client process executing on the local computer to a server process executing on a remote computer. The information received by the server allows the server to uniquely identify the network system for which the address was required and therefore to provide the required address. The address resolution procedure is completed when the client receives a response from the server containing the required address.

Proxy-ARP (See RFC-1009 for a description) is a variation on the ARP protocol where a router (a system with more than one interface that routes packets between networks on or through the networks on each interface) will respond to ARP requests for systems on one interface made by systems on an other interface with it's own MAC address. This is done to support situations where it is necessary or expedient to split a network without sub-netting or where machines not capable of understanding sub-nets have to reside on sub-netted networks.

SolutionIP modifies the standard behaviors described above on an interface-by-interface basis by promiscuously responding to ARP requests. This is an extension to Proxy-ARP. In general, any ARP request is responded to by the SolutionIP Server with the SolutionIP Server's MAC address regardless of the IP address being requested, with the following exceptions:

1. Microsoft windows and some other OSs, while booting, will send an ARP request for the IP address that their interface is configured for, and if they receive a response they will shut down that interface and not attempt any network activity. This is a test to ensure that the IP address to be used by the system is unique and avoid conflicts. These test packets have unique characteristics that allow the SolutionIP server to recognize them and not respond to these requests.
2. If the ARP request is for a system for which the SolutionIP server has an entry in the registration driver, then it is left up to that system to respond rather than the SolutionIP Server.
3. In the case where the SolutionIP Server needs the MAC address for an IP address it will first determine if an entry exists in the registration driver and if it does use that MAC address rather than sending an ARP request.

This allows the SolutionIP server to pretend to be the gateway (default router), DNS Server, etc. for clients using fixed IP configurations. In addition, the server avoids delays when communicating with systems on its client networks by using the registration driver rather than making ARP requests.

Registration Device Driver (Sometimes Referred to as Soln Device)

The registration device driver 304 is a pseudo driver in that it is not actually associated with any physical device but rather the device is the registration data that is stored and managed by this driver. The registration information maintained by the driver includes:

Original IP—this is the original IP address that the client used when communicating with the server. Under certain circumstances, it may be equal to the assigned IP address. A fixed IP configured client will have the IP address for which the client is configured. For a DHCP configured client this will usually be zero or the IP address that the client was assigned on its previous network or it will equal the assigned IP address.

Assigned IP—this is the IP address assigned to the client by the registration server. This will be a number chosen from the available IP addresses in the address ranges that the driver is configured to support. An IP address is always assigned to each new MAC address as it is encountered. If the original IP address is equal to an unassigned IP address that the driver has been configured to support then that IP address will be assigned, otherwise the next available IP address will be offered.

MAC address—this is the MAC address of the client system.

Creation Time—is the time that the IP address was assigned to this MAC, this happens when the first packet is received from the client.

Registration Time—is the time that the client was registered (for internet access) by going through the registration process for that site.

Registration Expiry—is the time that the registration is due to expire (lose internet access).

Entry Expiry—is the time that the assigned IP address will be returned to the pool of free IP addresses.

Last Used—the last time there was traffic to/from the client system.

Flags—used to contain bit fields used to indicate the state and nature of a particular client (i.e. registered; DHCP; valid; permanent; no expiry; etc.)

This information is accessed and manipulated by other kernel drivers and processes through function calls defined in Registration Device Driver 304. User space applications access and manipulate the registration information with the standard Linux device interface and the associated ioctl calls. Entries can be looked up using original IP, MAC, or Assigned IP addresses. All characteristics of an entry can be manipulated, although not all directly, an entry can be marked as registered and the driver will assign the appropriate registration expiry time. Certain attempts to look up an entry will result in an entry being assigned if an existing entry can not be found, specifically the soln_get_aip_mac call will cause an IP address to be assigned to the specified MAC address if an existing entry can not be found. A complete dump of the current state of the driver can be obtained by opening and reading the device. Likewise, this information can be used to initialize the driver by opening the device and writing the same (or similar) information back into the device. This gives us the ability to backup and restore the current state of the driver thus minimizing the effects of reboots on registered clients. In addition to the information described above the state information for the driver includes:

How often the driver's current time is updated (time granularity).

How often to run the purge algorithm that looks for registered entries to expire and to for unregistered entries to be purged.

What the default expiry mode is for the system this can include one of the following:

0. NO_EXPIRY—where no entry is ever expired automatically.
1. RELATIVE_OFFSET_EXPIRY—where entries are expired a fixed amount of time relative to the time that they registered.
2. TIMEOFDAY_EXPIRY—where entries are expired at a particular time of day regardless of when they registered.

The expiry period is either the time offset for the relative offset mode or the time of day for the time of day mode depending on the expiry mode chosen.

The time of day grace period, this is used to determine if the second time of day expiry should be used rather than the next. In other words if the time of day expiry time is 11:00 am and the grace period is ½ hour then if someone registers between 10:30 am and 11:00 am they will actually be registered until the following day rather than just being registered for ½ hour or less.

The inactive timeout which is used to decide whether to expire a unregistered entry, in essence if activity has been detected for an entry within the inactive timeout period then the entry will not be purged.

The number of ranges available for assignment to clients.

The range data, each range is specified by a starting IP address and an ending IP address the IP addresses must be of the form A.B.C.x and A.B.C.y where 0<=x<=y<=

255. Thus each range may consist of up to 256 entries, this allows multiple ranges to specify a network larger than a class C subnet.

In addition to externally triggered events, the registration driver has certain automatic activities that it performs on a regular (configurable) basis:

If the current time is older than the registration expiry time of an entry then the driver will unregister that entry, unless that entry is marked as no expiry.

If the current time is older than the entry expiry time of an entry then the driver will purge that entry (return the assigned IP to the pool of available assigned IP addresses) unless the entry is marked as permanent.

The registration driver updates its concept of what the current time is.

TCP/IP Socket Interface

The TCP/IP Socket Interface (311) is the standard socket networking interface provided by Linux, Unix, and many other operating systems that provide networking services.

Command Line Interface/Soln Daemon

The Command Line Interface 317 offers an administrative and diagnostic tool to system administrators. It serves as a user space interface into the registration driver. It has options for most of the Registration Driver's ioctls. It can be used to check the current state of the registration driver 304 or modify it.

The Soln Daemon 315 shares the same code base as the Command Line Interface 317 and thus shares much the same functionality. It is launched from the Command Line Interface using a command line parameter that forces it to run as a daemon. As a daemon, it has several special functions. It is responsible for performing regular periodic backups of the registration driver. It also listens for UDP traffic on a specified port. This facilitates most of the registration and administrative requirements of the web based interface. It is also able to communicate with Solsnmpd (a module for carrying out network management) and retrieves information as required during a registration request.

IPFW/ipfwadm/Packet Filter Rules

The packet filter module 305, 306 allows packet filter rules that test the state of the registration entry flags for the source and/or destination addresses of packets, these tests include:

tests for whether the address is a valid entry or not (i.e. is it in a valid range and has it been assigned to a MAC address);

tests for whether the address is a DHCP entry or not; and tests for whether the address is registered or not.

Ipfwadm, the standard Linux utility for defining the packet filter rules in the kernel at run-time has been modified to set and interpret the new tests as specified above.

Packet filter rules are defined to provide the following functionality:

unregistered clients' POP requests are redirected to the SolutionIP custom POP server;

unregistered clients' HTTP requests are redirected to the redirection web server 314 that is configured to redirect requests to the registration web server 310.

All clients' DNS requests are redirected to the local DNS server 312.

All other unregistered clients' requests are blocked.

All registered clients' SMTP requests are redirected to the local SMTP server not shown).

Where unroutable addresses are used for clients the filters can be configured to perform masquerading or NAPT (Network Address Port Translation).

Other filters can be configured to provide security for the SolutionIP server or to block client access to specific arbitrary protocols.

Packet Drivers

The packet drivers 303 have enhanced functionality over the standard Linux protocol handlers at the point where the generic packet handlers interface with the hardware specific Ethernet drivers. This additional functionality is selectable on a per-interface basis.

On an enabled interface, all incoming packets are examined, and their MAC looked up in the registration driver. If the packet is an IP or ARP packet then the MAC is looked up in the registration driver, if this is the first time that this MAC is encountered then an IP address is assigned and if the source IP address of the packet is a valid unassigned IP address then that IP address will be assigned to that MAC address. Once the assigned IP address is determined, sanity tests are applied to ensure that the original IP address associated with the MAC has not changed in an unacceptable manner, if it has changed in an unacceptable manner then the entry is deleted, thus forcing the client to re-register if they were previously registered. If the assigned IP address is different from the original IP address in the client's packet then that IP address will be replaced with the assigned IP address in the IP or ARP header and the packet checksum recalculated according to the methods described in RFC-1624. If the packet contains a TCP or UDP packet then the checksum is further recalculated as above to account for the changed IP address in the pseudo-header associated with such packets as described in section 3.3 of RFC-1631.

All outgoing packets on an enabled interface have their source destination address looked up in the registration driver (as an assigned IP address). If a matching entry is found then the original IP address is substituted provided it is non-zero and not equal to the current destination address. Then the packet's checksums are recalculated as described above for incoming packets.

DHCP Server

A modified DHCP server 316 has been included in SolutionIP to provide IP addresses to clients requesting IP information based on the assigned IP address provided by the registration device driver 304 for that client's MAC address. Additionally the DHCP server 316 has been modified to provide leases based on the inactivity timeout as obtained from the driver.

Pop Server

A modified POP server 313 is provided to:

accept any usemame and password combination;

ignore all mailbox-modifying commands; and present a special mailbox with a single new site-specific message as the only available mail. The intention of this message is to direct the user to use their web browser to access the web so they can register for the service.

Normally POP (a request to read or download mail from the client's email server) requests from clients would only be directed to this server if the client is attempting to access their e-mail without being registered.

SMTP Server

A MTA (Mail Transfer Agent) has been configured to:

Act as a mail gateway for clients. Many sites configure their mail servers to block outsiders from sending mail through them to another site. This is a security precaution against spammers using a site as a relay. We redirect all clients SMTP traffic to our local server so clients will be able to send mail as necessary.

The SMTP server (not shown on FIG. 3) is configured to block relaying attempts using the SolutionIP server.

Redirection Web Server (solhttpd)

The firewall rules redirect all unregistered traffic on port 80 (http) to a special port on the SolutionIP server. The solhttpd daemon is a web server 314 configured to listen for http traffic on a special port. When it receives an http request, it is configured to rewrite the URL such that it will send the client to the Registration WEB Server 310. This means that any unregistered client who launches their standard web browser will be redirected to the Registration WEB Server instead of their intended destination.

Registration Web Server

The Registration WEB Server (310) is a web server that serves local content for the SolutionIP server. This includes the Registration WEB pages, Administrative WEB pages, and Configuration WEB pages.

Registration/Administration/Configuration Web Pages

The Registration WEB pages serve as a client's gateway to SolutionIP services. This includes registering for access to the Internet. The client can choose between two different methods of authentication, port based or access code based. In the port based authentication model, a client's room and fee information is determined based upon their assigned IP address (facilitated by Solsnmpd). In access code based authentication, clients can enter access codes that map them to a particular room number and fee.

In addition to the registration side, there is also an administrative set of pages. These pages allow server administrators and staff to perform various tasks. These include:

the checking the current state of the registration driver;

manual registration changes;

modification of registration driver settings;

modification of Soln Daemon settings;

display system health variables;

display of billing information; and, the display and generation of access codes.

The registration WEB pages use the Soln Daemon (315) to communicate with the Registration Driver and Solsnmpd to facilitate administration and the registration process.

Also provided are several first generation web based configuration tools. Primarily, these are designed as middleware to insulate the users from the database.

Billing Database (ipbilling)

A standard open source relational DBMS (database management system) implements a schema designed to support the billing process. The schema allows flexible configuration of the system and includes the following:

site configuration information;

fee information;

network infrastructure and associated mappings, including room to port mappings and other switch-related information;

billing and usage information; and access Codes.

DNS Server

A standard open-source DNS server 312 is provided to all clients to handle their DNS requests. There is nothing special about this server; rather what is special is that all client DNS requests are directed to this server. This ensures that no client (static or DHCP) will have its DNS requests timeout because the DNS server is either inaccessible (behind a firewall) or too far away (too many network hops) to respond in a timely manner.

Solsnmpd

This server uses a proprietary protocol to accept requests and return results. Request and response packet formats are defined as needed for each query. The purpose of this daemon is to handle communications with switches and other network devices on the client network using Simple Network Management Protocol (SNMP) to achieve various ends. The initial functionality for this daemon is to accept requests to determine at which "physical port" a client is connected. The daemon is sent a request containing the MAC address of the client. The daemon then uses the switch hierarchy as defined in the billing database to walk through the switches using the Bridge MIB (RFC-1493) to determine the what port the client is connected through. Once the switch and port are determined then the "physical port" can be derived, again using the billing database. This information is returned to the requesting process.

Solsyncd

This server (not shown in FIG. 3) extracts configuration information from the billing database and places it in flat (text) configuration files to allow access of the configuration information without accessing the database. If the resulting configuration files have changed then a HUP signal will be sent to specific processes so they will re-read their configuration files and get the updated data.

Process Monitor (keepalive)

This script is run every minute and is configured to check the status of several daemons on the server, complain if they are not running and if they continue to not run for a configurable length of time they are restarted.

Server Configuration Tool (reconfig-all.pl)

This tool takes a per-site configuration file and applies it to a hierarchy of template configuration files to configure the server for a particular site.

From the above description is recognized that not all components have been shown of FIG. 3 but a person skilled in the art would understand how the functionality described by the components not shown would be integrated into the system. It can be seen from the above description that the term server is used both to refer to a computer running the programs to achieve the desired functionality and to software modules themselves that carry out the desired functionality. It is understood that there is a continuum of structure and various aspects of the invention can be carried out by hardware, firmware or software, or a combination, as may be desired.

Server Processing

The following sections describe various processing carried out by the server in general terms.

DHCP Request Processing

The processing performed by SolutionIP™ for DHCP requests is described below in reference to FIG. 4.

When a guest with a computer configured for DHCP powers on, the computer 401 initiates a DHCP request to the other computers on the LAN. The modified DHCP server 405 receives and processes that request. The DHCP server 405 captures the MAC address of the guest computer 401 and initiates a request for an IP address to the Registration Device Driver 404. The Registration Device Driver provides an appropriate IP address for the guest. The IP address is returned to the DHCP server, which then passes the address and any additional parameters (gateway to use, DNS server to use, etc.) back to the guest's computer.

ARP Request Processing

The processing performed for an ARP request is described with reference to FIG. 5, below.

To identify exactly which machine on a LAN has a particular IP address, a guest's computer 501 initiates an ARP request, asking for the MAC address of the machine having the specified IP address. The Registration Device Driver 504 detects the ARP request and responds with its own MAC address via the ARP server 505, regardless of the IP address actually requested. While processing the ARP request, the ARP server 505 will notify the Registration Device Driver 504 of the guest computer's MAC address and IP address. The Registration Device Driver 504 can then determine if a matching MAC address and IP address pair exists, as well as whether NAT will be required for the guest computer. The Registration Device Driver 504 will then update its data structures with the new information if necessary.

Unregistered HTTP Request Processing

Processing of HTTP requests involves redirecting unregistered guests to the registration web server, and allowing requests from registered guests to be routed normally. Processing of unregistered HTTP requests is described as shown in FIG. 6.

Processing of a Hypertext Transfer Protocol (HTTP) request begins with receipt of the request by SolutionIP™'s packet drivers 603. These drivers query the Registration Device Driver 604 to identify whether NAT translation of the packet headers is required. If required, the packet drivers 603 perform this translation. The IPFW component 606 is then given control of the request. It queries the Registration Device Driver 604 to determine whether the guest is registered. If the guest is registered, it allows the request to be routed normally. If the guest is not registered, the request is passed to the Redirection Web Server 608, which translates it into a request for the registration area of the Registration Web Server. The translated request is then submitted to the Registration Web Server and the guest is presented with the hotel's registration screen. If the guest chooses to register for the network access service, this information is provided to the Control Program/Daemon, which updates the Registration Device Driver appropriately. Subsequent requests from the guest computer following the update of the Registration Device Driver will be processed as from a registered guest.

Registered HTTP Request Processing

The following description is made in reference to FIG. 7. The general processing performed by the SolutionIP™ server for IP-based traffic other than web and email traffic is the same as shown in FIGS. 6 and 7 except that it is not subject to redirection. IP-based traffic initiates from the guest's computer 701 and is sent to the SolutionIP™ server. The packet drivers 703 on the SolutionIP™ server then determine whether the traffic requires NAT and performs translation on the headers if so required. The IPFW packet filter 705, 706 then determines whether the guest has registered for the network access service. If the guest is registered, the data traffic is allowed to proceed and is routed normally. If the guest has not registered, the data is blocked by discarding the incoming network packets.

Billing Aspect of Invention

The following section describes the components and functionality of the billing aspect of the server and method invention.

The billing aspect of the invention has two methods of registration, access codes and port identification. Access codes are generated for each room on a daily basis. Clients must enter the access code for their room as part of the registration process. Port identification will automatically determine the client's room number by querying the network switch infrastructure to determine the specific switch port from which the client is connected. Switch ports will be mapped to specific rooms. Access codes can be used in the event the client is not connecting from a guestroom, such as when working from a public area in the hotel, or if the switch port cannot be determined.

Authorization codes are used as an override mechanism to apply special processing rules (discounts, free usage, etc.) to particular clients. The system stores and displays the authorization code as part of the billing report. The interpretation and application of authorization codes is the responsibility of hotel staff.

The hotel Property Management System (PMS) performs the actual billing of clients. The billing system provides web-based reports which can be printed and manually entered in the PMS by hotel staff.

Requirements

SolutionIP requires two Pentium class systems operating at 200 MHz or greater. One functions as the SolutionIP server while the other hosts the web site and database. These machines require the following hardware:

64 MB RAM;

4.5 GB hard drive;

Network Interface Card (NIC) (Linux compatible) NOTE: The SolutionIP server requires two NICs and the web server requires one;

Monitor and keyboard are optional; and

Two serial ports.

The client component has the following requirements:

Network Interface Card and connector;

Web browser;

TCP/IP stack; and

A printer connection will be required for billing reports.

SolutionIP supports a variety of client operating systems including Win95, Win98, WinNT, MacIntosh OS 8 and Linux.

The switches for port identification must support:

Bridge MIP (RFC 1493);

SNMP read access; and

1—1 mapping (room to port).

The software requirements are based on the functionality of each machine:

SolutionIP Server:

Operating System—RedHat Linux 5.1.

SolutionIP Web/Database Server:

Operating System—RedHat Linux 5.1;

Web Server—Apache;

Database—PostgreSQL 6.4 or higher; and

Perl 5.004.

It is understood that the aforementioned components are for the preferred embodiment. A person skilled in the art would recognize that other components could be used without departing from the invention.

Areas of Functionality

Three main areas of functionality exist for the billing system. These include port identification, access code generation and interpretation, and billing system administration. This section presents an overview of the general requirements of the system, as well as the specific requirements for each of the areas of functionality.

Overview of Billing

Billing begins with the identification of the room associated with each client. Rooms are identified either manually by associating an access code with a particular room, or automatically by obtaining the switch port the client is connected to and deriving the associated room. The system provides facilities to automatically generate a new access code for each room, either for the current day or the next day. The codes are displayed via a web page and can be printed. A configurable history of access codes is maintained to prevent duplicate codes from being generated within the history period. No mechanism is provided to prevent access codes from being used more than once or by more than one client. Each new MAC registering is billed to the associated room. Registrations will be valid until the next checkout time. The access code is used to determine which room to bill, and so it will be the responsibility of the client to ensure that the code is kept secure. Billing is based on the room from which the client registers when using port identification.

Once the room is identified, the fee associated with that room will be determined. A flat fee per day will be associated with each room (different rates can be charged for different rooms). The registration interface allows clients to enter special authorization codes. These codes will be stored with the client's billing information. Authorization codes used will be included in the billing report generated for hotel staff, but will not actually affect the fee generated by the billing system. Interpretation and application of authorization codes will be the responsibility of the hotel staff.

A web-based billing report is provided and printed by the hotel staff. It displays who has been online since the last checkout time. Additional queries for arbitrary dates is also available. These show who was online from checkout time on the specified day until checkout time the next day. Information included in the report includes client room, registration time, access code, port, authorization code, and fee. Access to all administrative web reports are password protected.

The database is capable of storing one month's worth of data. Backup, restoration, and disaster recovery procedures can be provided.

Port Identification

One method of associating a client (MAC Address) with a Room for billing purposes is Port Identification. If, on registration, the physical port connection can be identified as being associated with a room, then that client's registration will be billed to that room. To determine what physical port a client is connected to the Simple Network Management Protocol (SNMP) is used to discover which switch port they are talking to, static data tables are then used to determine the room number.

The switch/port number that a MAC is using is determined by using SNMP to search the installation's switches.

Mapping from the switch/port number that a MAC appears on identifies physical ports. This mapping is maintained in the database.

Physical ports map to room numbers and billing rates. These mappings are maintained in the database.

The determination of the MAC to physical port mapping is done on an as required basis.

If port identification is available it takes precedence over access code identification and no access code is requested of the user during the registration process. The exception to this are physical ports flagged as requiring a valid access code for registration to succeed.

Access Code Identification

An alternative to Port Identification is Access Code Identification. Each access code is associated with a particular room and will be valid for a limited time period (usually one day from checkout time to checkout time). If port identification fails or is not available on a given port then the client will be prompted for an access code which the system then validates. This will ensure that a billing record is generated for the appropriate room.

Administrative Features

This section of the specification describes the administrative features related to billing. The administrative features serve as the interface between the billing system and the hotel staff. The two main components are the billing and access code reports.

Billing Report

The billing report provides information to the hotel staff regarding room numbers, access codes, authorization codes, physical ports, registration time and fees. The report is web-based and viewable from a standard web browser. The hotel staff are able to generate and view the report on an as-needed basis.

Access Code Generation and Report

The access code report provides hotel staff with the information related to room numbers and access codes. The report is web-based and viewable from a standard web browser. The hotel staff are able to generate and view the report on an as-needed basis. Upon reviewing a report, the system automatically generates access codes for the current or the following day if they do not exist in the database.

Functional Components

The following section describes the functional components of the billing system and refers to FIG. 8. It is to be understood that the preferred embodiment here described uses two computers acting as servers but a person skilled in the art would understand that one server could be used or more than two could be used without departing from the invention.

Overview

The billing system consists of components running on both the SolutionIP Server 802 and the Web Server 801. The Web Server hosts the billing and configuration database 803, the Admin Interface 804 which will be part of the Admin web site and the Registration Interface 805 which will be the existing Registration Web pages with modifications to accommodate the new billing system methods. On the SolutionIP Server the Registration Driver 806 and Command Line Daemon 807 accommodates the new billing system methods. The Synchronization Daemon 808 and the SNMP Daemon 809, are implemented to support the billing system.

Database

The Billing System in the preferred embodiment is implemented using a PostgreSQL 6.4 database. The database stores configuration information, access codes, and billing records. One month of data will be maintained at any given time. Data older than one month will be regularly purged from the database. Database backup and recovery procedures can be provided required.

Configuration data handled by the database includes switch configuration information (switch addresses, types, mappings of switch ports to rooms, etc.). Hotel checkout time, amount of data history to maintain, and other related parameters will also be stored in the database.

The database stores the access code and its effective dates for each room. By default, each code will only be effective for one day. A history of access codes for each room is kept. New codes are checked against this history to prevent duplication.

Billing records identify the room to be billed for each connection. The following fields will be included in this record:

room number;

port registered from;

access code used;

authorization code;

registration date and time; and type of fee to be charged.

In certain cases, some fields may be NULL. For example, the access code would normally be NULL when port identification is being used.

Command Line Daemon

The daemon has the ability to handle multiple simultaneous requests from other systems, preserve parameter changes and track the state of registration driver backups. The daemon also accommodates the use of the SNMP 809 and Synchronization daemon 808.

Registration Device Driver Interface Functions

The Command Line Daemon 807 is the primary interface into the registration device driver 806. The functionality of the registration device driver accommodates the billing system The command line daemon supports the following operations:

- set the original room and port id for a specified user;
- set the current room and port id for a specified user;
- block a specified user, so they can not register;
- unblock a specified user, so they can register;
- flag a specified entry as permanent;
- flag a specified entry as no longer permanent; and
- set a grace period (time period prior to checkout, during which registrations will not expire until checkout time the next day).

Interface to SNMP Daemon

The billing system communicates with the SNMP Daemon 809 via the Command Line Daemon 807. The Command Line Daemon 807 channels all traffic between the other billing system components and the SNMP Daemon. The Command Line Daemon also updates the Registration Device Driver 806, where applicable, with the results received from the SNMP Daemon.

The command line daemon:

- responds to requests for port id resolution from both the registration server and kernel drivers;
- forwards requests for port id resolution to the SNMP Daemon;
- receives port ids back from the SNMP Daemon;
- passes port id information back to requestor; and
- informs the kernel of port id information if the kernel was not the requestor of the transaction.

SNMP Daemon

The purpose of the SNMP Daemon 809 is to resolve MAC addresses to their physical port number, or return an error if this is not possible. This Daemon uses SNMP to interrogate the network switches to find the switch port that the client is connected to and then use static data tables to map that switch port to a physical port number.For this component:

- configuration data is obtained from flat data files stored on the SolutionIP Server;
- configuration data files will be derived from database tables and updated by the Synchronization Daemon;
- when Configuration files are changed the SNMP Daemon will be informed by the Synchronization Daemon; and
- requests and responses are handled through standard Interprocess Communication Methods to other components on the system.

Registration Device Driver

The Registration Device Driver supports billing and production requirements. The driver maintains information on client MAC addresses, original IP addresses, and assigned IP addresses. Timing parameters are included to allow fixed-length registration periods, as well as inactivity timeouts for unregistered clients. A Time of Day expiry mode is included. The method of expiration will be determined at the time of client registration. Under the Time of Day expiry mode, registrations will expire at the next checkout time (or any arbitrary time each day). Currently new registrations are expired at the end of a fixed time interval, typically 24 hours. The Time of Day expiry mode is more consistent with normal hotel billing routines. The existing expiry calculation mode will be preserved as an option.

In addition to the new expiry mode, the ability to override parameters for individual clients is available. Existing driver parameters serve as defaults, and affect all clients. An overide mechanism allows administrators to change specific parameters on a client-by-client basis. An example might be to extend the expiry time of a particular client, without affecting the expiry times of other clients.

In addition to operating on MAC and IP address information, the driver includes and operates on room and port data. The work of associating rooms and ports with clients in the driver is performed by external components (the billing system and SNMP daemon). Operations supported by the driver, such as registering or deleting entries, allow such operations to be performed on all clients associated with a particular room or port.

Production requirements include the ability to reserve specific addresses or make entries permanent. This allows support maintenance access to network devices, such as switches, which reside on the client side of the servers. A mechanism to block particular clients is also implemented. This mechanism identifies clients by room, port, or MAC. Blocked clients are able to access the registration server and other services available to unregistered guests, but they are prevented from registering for full system access.

Synchronization Daemon

The purpose of the Synchronization Daemon 808 is to centralize access to the database by components of the SolutionIP Server through one interface. The daemon uses information stored in the database to create flat configuration files on the SolutionIP server. This allows configuration information for the various components to be centralized in the database but does not preclude their being maintained on the server if a database is not available or required at a particular installation.

When files are updated by the Synchronization Daemon, the processes that use them are informed that an update is available (methods of communicating this include signals, IPC semaphores or having the process monitor the last modified time of its configuration files). It is also possible to have this process update information in the database based on status files from the SolutionIP server.

Web Server Registration Process

The registration process takes advantage of the billing system methods. When a client attempts to register, the system first attempts to determine if they are connecting from a room that allows billing via the port identification method. If a billable room is identified using this method then the user will be presented with the Authorization-Confirmation Screen. If a billable room cannot be identified using the Port Identification Method then the Access Code Identification method will be used. The user will be presented with an access code entry screen, when the user enters a valid access code then the billable room will have been identified and they will be presented with the Authorization-Confirmation Screen. The Authorization-Confirmation Screen will present the user with the room number and rate and any other important information. The user will also be given the opportunity to enter an optional Authorization Code. Once the user confirms their willingness to pay the specified rate they will then be taken to The Virtual Concierge. This allows one to access a variety of services offered through the hotel as well as the www and email.

Particular User Examples

To better understand the operation of the invention a number of specific exmples follow that explain in detail the steps carried out by the invention in order to achieve the results desired in the particualr scenarios set out.

Client Startup

System Startup

Scenario: Client boots their computer.

Fixed IP

Scenario: Client is configured with a fixed IP configuration.

1. Client turns system on.
2. System generates an ARP request to see if its IP address is already in use.
3. SolutionIP server picks up the ARP request and passes it to the Packet Driver.
4. The Packet Driver asks the Registration Driver to look up the Assigned IP address for the MAC of the packet.
5. The Registration Driver, not able to find an entry for that MAC assigns a new IP address from the pool of available IP addresses.
6. The Packet Driver performs NAT on the ARP packet (as necessary).
7. The Packet is passed on to the ARP handler.
8. The ARP Handler sees that the Source IP address is Equal to the Destination IP address and drops the ARP request.
9. Eventually the client times out and assumes that it is the soul owner of that IP address on its network.

DHCP

Scenario: Client is configured for DHCP.

1. Client computer makes a DHCP DISCOVER request.
2. This request is intercepted by the packet driver who asks the registration driver for the assigned IP address for this MAC.
3. The registration driver will attempt to lookup the assigned IP address for the MAC and if it not found create a new assignment based on its pool of free addresses.
4. The packet driver will NAT the request as required and forward it to the DHCP server.
5. The DHCP server will lookup the assigned IP address for the MAC address and return a DHCP OFFER response for that address.
6. The ARP handler looks up the MAC address for the destination address from the Registration Driver and inserts that MAC address into the packet.
7. The packet driver will intercept the response and perform NAT if required.
8. The user's DHCP client will respond with a DHCP REQUEST for the assigned IP address.
9. The packet driver will intercept the request, perform NAT if required and forward the request to the DHCP server.
10. The DHCP server will lookup the assigned IP address for the MAC address and return a DHCP ACK response for that address.
11. The ARP handler looks up the MAC address for the destination address from the Registration Driver and inserts that MAC address into the packet.
12. The packet driver will intercept the response and perform NAT if required.
13. The client obtains the IP address.

Browser Startup

Scenario: Client starts their WEB browser, and attempts to load a WEB page.

1. Client starts WEB browser.
2. Browser needs to look up the IP address of the WEB server so it generates a DNS request.
3. SolutionIP server picks up the DNS request and passes it to the Packet Driver.
4. The Packet Driver asks the Registration Driver to look up the Assigned IP address for the MAC of the packet.
5. The Registration Driver returns the AIP to the Packet Driver.
6. The Packet Driver performs NAT, if necessary.
7. The packet is passed on to the Packet Filter that redirects the request to the SolutionIP DNS server.
8. The DNS server looks up the HTTP server and creates a response for the client.
9. The response packet goes to the ARP handler that asks the Registration Driver to look up the MAC address for the client and then the ARP handler adds it to the outgoing packet.
10. The packet is then passed to the Packet Driver that looks up the Original IP address for the Assigned IP address and performs NAT if necessary.
11. The response is sent back to the client.
12. The client will generate an ARP request for their gateway server (assuming that the IP address returned for the HTTP server was not local, if it is local then the client will be requesting the MAC of the HTTP server instead).
13. The SolutionIP server will pick up the ARP request and pass it to the Packet Driver.
14. The Packet Driver will ask the Registration Driver to look up the Assigned IP address for the MAC of the packet.
15. The Registration Driver will return the AIP to the Packet Driver.
16. The Packet Driver will perform NAT as necessary.
17. The ARP request is passed on to the ARP handler
18. The ARP handler generates a response saying that the SolutionIP server's MAC is the MAC for the requested IP address.
19. The ARP response is passed back to the Packet Driver.
20. The Packet driver looks up the OIP of the packet destination using the AIP and performs NAT if necessary.
21. The ARP response is sent back to the client.
22. The Client then sends a HTTP request to the IP address returned by the DNS to the MAC address returned by the ARP response.
23. The HTTP request arrives at the SolutionIP server and is passed to the Packet Driver.
24. The Packet Driver gets the Registration Driver to look up the AIP for the MAC and performs NAT if necessary.
25. The Packet is Passed to the Packet Filter which determines that the client is unregistered
26. The Packet is redirected to the Redirection Web Server (solhttpd).

27. The Packet is redirected to the Registration Web Server.
28. The Registration Web Server generates the response to the HTTP request.
29. The Packet is passed back to the ARP Handler that looks up the MAC associated with the AIP of the client and updates the packet.
30. The Packet is passed back to the Packet Driver that looks up the OIP associated with the AIP and performs NAT if necessary.
31. The response is passed back to the client.

The conversation will continue from here but the form will be similar to the above.

Client Registration

Scenario: having been redirected to the Registration Web Page, the client then registers for the service.

Port Based

Scenario: the client is plugged into a switch port on which port-based authentication has been configured.

1. The client accesses the registration web page that triggers the execution of a CGI script.
2. The CGI checks the database and determines that port-based authentication has been configured.
3. The CGI requests the MAC address and physical port information for the assigned IP address from Soln Daemon.
4. Soln Daemon asks the registration driver for the MAC address associated with the assigned IP address given.
5. The registration driver returns the MAC address associated with the assigned IP address.
6. Soln Daemon asks Solsnmpd for the physical port number associated with the given MAC address.
7. Solsnmpd returns the physical port information after resolving the port based upon the given MAC address.
8. Soln Daemon returns the MAC address and physical port information based upon the assigned IP address given.
9. The CGI requests room number and fee information from the database for the physical port number.
10. The database returns the room number and fee information for the physical port given.
11. The CGI dynamically generates HTML for the client that reflects the room and fee information returned from the database.
12. The client chooses to accept the fees and continue with registration.
13. The CGI requests registration for the assigned IP address from the Soln Daemon.
14. The Soln Daemon asks the driver to register the entry with the given assigned IP address.
15. The CGI inserts the client's information into the database and forces the portal page to the client.

Access Code

Scenario: the client is plugged into a switch port on which port based authentication has not been configured and access codes are enabled on this installation.

1. The client accesses the registration web page that triggers the execution of a CGI script.
2. The CGI checks the database and determines that port based authentication has not been configured and access codes are enabled.
3. The CGI dynamically generates HTML for the client that reflects need for them to enter access code information.
4. The client enters access code information into the form.
5. The CGI requests the room number and fee information from the database for the given access code.
6. The database returns the room number and fee information for the given access code.
7. The CGI dynamically generates HTML for the client that reflects the room and fee information returned from the database.
8. The client chooses to accept the fees and continue with registration.
9. The CGI requests registration for the assigned IP address from the Soln Daemon.
10. The Soln Daemon asks the driver to register the entry with the given assigned IP address.
11. The CGI inserts the client's information into the database and forces the portal page to the client.

Automatic

Scenario: the server has been configured to automatically register new clients. The main effect here is that clients are always directed to the portal page the first time they access the WEB.

1. The client is redirected to the registration web page that triggers the execution of a CGI script.
2. The CGI requests registration for the assigned IP address from the Soln Daemon.
3. The Soln Daemon asks the driver to register the entry with the given assigned IP address.
4. The CGI forces the portal page to the client.

Client E-mail

Registered

Sending

Scenario: A registered client is attempting to send an e-mail using their e-mail client software (Netscape, Outlook, Pegasus, etc.)

1. The client sends the e-mail using their preferred client software and configured outgoing SMTP mail server.
2. Mail client looks up SMTP server's IP address using DNS.
3. Mail client looks up the MAC address of either the SMTP server or their gateway using ARP.
4. The Packet Filter transparently redirects all SMTP traffic for registered clients to the local SMTP server.
5. The SMTP server acts as a proxy and sends the e-mail on behalf of the client.

Unregistered

Popping

Scenario: An unregistered client is attempting to pop their e-mail from their home system using their e-mail client software (Netscape, Outlook, Pegasus, etc.)

1. Client looks up POP server's IP address using DNS.
2. Mail client looks up the MAC address of either the POP server or the gateway using ARP.
3. The Packet Filter transparently redirects all POP3 traffic for unregistered clients to the local POP3 server.
4. The POP3 server accepts any usemame and password combination and delivers a single new e-mail message to the client.
5. This e-mail typically informs the client that they have not registered for the service and instructs them how to do so.

Client Traffic (General)

DHCP

Scenario: A DHCP configured client sends and receives packets through the SolutionIP server.

Sending

1. Client generates a packet for a remote host routed through the SolutionIP Server.
2. SolutionIP Server receives the packet and passes it to the packet driver.
3. The packet driver examines the packet and looks up the AIP in the Registration Driver using the MAC address.
4. The packet driver determines that the AIP and the original Source address are equal and that NAT is not necessary.
5. The packet is passed to the packet filters see the Registered and Unregistered sections below.

Receiving

1. Packet is passed from the packet filters to the ARP handler.
2. The ARP handler will look up the MAC address of the destination host of this packet.
3. The packet will then be passed on to the packet driver that will look up the entry for the Assigned IP address and determine that no NAT is necessary.
4. The Packet will then be transmitted to the client.

NAT

Scenario: A Fixed IP configured client sends and received packets through the SolutionIP server.

Sending

1. Client generates a packet for a remote host routed through their gateway (however the SolutionIP server will claim to be that gateway when the client makes their ARP request)
2. The SolutionIP Server receives the packet and passes it to the packet driver
3. The packet driver examines the packet and looks up the AIP in the Registration Driver using the MAC address.
4. The packet driver determines that the AIP and the original Source address are not equal and that NAT is necessary.
5. The packet is NATed and passed on to the packet filters see the Registered and Unregistered sections below.

Receiving

1. Packet is passed from the packet filters to the ARP handler.
2. The ARP handler will look up the MAC address of the destination host of this packet.
3. The packet will then be passed on to the packet driver that will look up the entry for the Assigned IP address and determine that NAT is necessary.
4. The packet driver will perform NAT on the packet and transmit the packet to the client.

Registered

Routable

Scenario: Traffic from and to a registered client with a routable assigned IP address is received and sent by the SolutionIP server.

Sending

1. Packet is received by the packet filters.
2. It is determined that the packet can be forwarded.
3. Packet is forwarded out the appropriate external interface, through the appropriate router. (Usually there is only one external interface and one router)

Receiving

1. Packet is received by the external interface.
2. Packet is passed to the packet filters and it is determined that it may be forwarded.
3. Packet is passed on to the ARP handler to have the appropriate MAC added. (See the appropriate NAT or DHCP Receiving section above.)

Unroutable (Masqueraded)

Scenario: Traffic from and to a registered client with a unroutable assigned IP address is received and sent by the SolutionIP server which configured to masquerade the unroutable addresses.

Sending

1. Packet is received by the packet filters.
2. It is determined that the packet is to be masqueraded.
3. The packet filters assign a port on the SolutionIP server for the source port of this client.
4. The packet is transmitted NAPTed so it looks like it came from the SolutionIP server on the assigned port.

Receiving

1. Packet is received by the external interface
2. Packet is passed to the packet filters and it is determined that this port is a masqueraded port and the packet must be reverse NAPTed so it has the appropriate destination port and IP address.
3. The packet filters determine that the packet may be forwarded.
4. The packet is passed on to the ARP handler to have the appropriate MAC added. (See the appropriate NAT or DHCP Receiving section above.)

Unregistered

Unregistered client traffic in general is blocked by the SolutionIP server packet filter rules.

Client Expiry

Unregister

Scenario: A registered client has reached their registration expiry time.

1. The client is using various Internet services.
2. The Registration Device Driver (Soln Device) executes its purge function (NOTE: this happens on a configurable periodic schedule).
3. The purge function determines that the client's registration expiry time is less than the current time.
4. The purge function sets the entry to unregistered and calculates the entry expiry time (NOTE: the actual behavior depends on the expiry mode).
5. The Packet Filters allow any established connections to remain open.
6. The next http request initiated from the client as handled as previously described (see Browser Startup).

Purge

Scenario: An unregistered client has reached their entry expiry time, and they are inactive.

1. The client has disconnected from the network or otherwise become idle.
2. The Registration Device Driver executes its purge function.
3. The purge function determines that the client's entry expiry time (calculated as the last used time plus the inactivity grace period) is less than the current time.
4. The entry is deleted from the Registration Driver.
5. Any future traffic from the client will be handled as previously described (see Client Startup).

Many variations and changes would come to the mind of one skilled in the art without departing from the invention.

What is claimed is:

1. A method of providing a user access to a network for a computer configured for a different network, the method being implemented by a server to allow the computer to access the network via a foreign network without user initiated software or hardware configuration changes, the method comprising the steps of;

automatically determining and assigning an Internet Protocol (IP) address for the computer connected on the foreign network;

registering the computer in association with addressing information including the assigned IP address and a Media Access Control (MAC) address of the computer;

storing and maintaining the addressing information for registered computers; and filtering packets to permit only the registered computers to access the network; and translating an IP address in a packet based on the MAC address, and transparently directing traffic to and from the computer from and to the network based on the addressing information; and wherein the step of registering comprises the step of collecting and maintaining billing and registration status information, wherein the step of collecting and maintaining comprises the step of identifying the computer for billing purposes by using Simple Network Management Protocol (SNMP) and a network switching architecture to identify a switch port to which the computer is connected.

2. The method of claim 1 wherein the step of automatically determining and assigning comprises the step of examining whether an incoming packet from the computer is an IP or ARP packet, and the step of determining the assigned IP address based on the IP or ARP packet.

3. The method of claim 2 wherein the step of automatically assigning comprises the step of assigning an IP address to the computer from a pool of IP addresses for the foreign network.

4. The method of claim 3 wherein the step of registering comprises the step of fixing a registration period during which the computer is permitted access to the foreign network.

5. The method of claim 4 wherein the step of maintaining comprises the step of unregistering the computer when the registration period has expired.

6. The method of claim 1 wherein the step of maintaining billing information comprises the step of storing the collected information in a database.

7. The method of claim 1 wherein the steps of maintaining the addressing, billing and registration status information comprises the step of periodically backing up the said information.

8. The method of claim 1 wherein the steps of maintaining the addressing, billing and registration status information comprises the step of reloading the most current backup information in the event of a computer failure.

9. The method of claim 1 wherein the step of collecting and maintaining comprises the step of identifying the computer for billing purposes through use of a preissued access code.

10. A computer readable medium containing the computer instructions which when executed on a computer carries out the steps of claim 1.

* * * * *

UNITED STATES PATENT AND TRADEMARK OFFICE

CERTIFICATE OF CORRECTION

PATENT NO. : 7,007,080 B2
DATED : February 28, 2006
INVENTOR(S) : Tim Wilson

It is certified that error appears in the above-identified patent and that said Letters Patent is hereby corrected as shown below:

Title page,
Item [73], Assignee, should read -- SolutionInc Limited --.

Signed and Sealed this

Sixth Day of June, 2006

JON W. DUDAS
*Director of the United States Patent and Trademark Office*

UNITED STATES PATENT AND TRADEMARK OFFICE
Certificate

Patent No. 7,007,080 B2 Patented: February 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tim Wilson, Halifax (CA); and Steven Swain, Halifax (CA).

Signed and Sealed this Twenty-ninth Day of October 2013.

EDDIE C. LEE
*Supervisory Patent Examiner*
Art Unit 2100
Technology Center 2100

UNITED STATES PATENT AND TRADEMARK OFFICE

CERTIFICATE OF CORRECTION

PATENT NO. : 7,007,080 B2
APPLICATION NO. : 09/742006
DATED : February 28, 2006
INVENTOR(S) : Wilson et al.

It is certified that error appears in the above-identified patent and that said Letters Patent is hereby corrected as shown below:

Title page, item (12), delete “Wilson” and insert --Wilson et al.--.

Title Page, Item (75) Inventor is corrected to read:

--Tim Wilson, Halifax (CA); Steven Swain, Halifax (CA)--.

Signed and Sealed this
Seventeenth Day of February, 2015

Michelle K. Lee
*Deputy Director of the United States Patent and Trademark Office*